W. R. CAMPBELL.
APPARATUS FOR DRAWING GLASS.
APPLICATION FILED JUNE 18, 1914.
1,143,104.
Patented June 15, 1915.
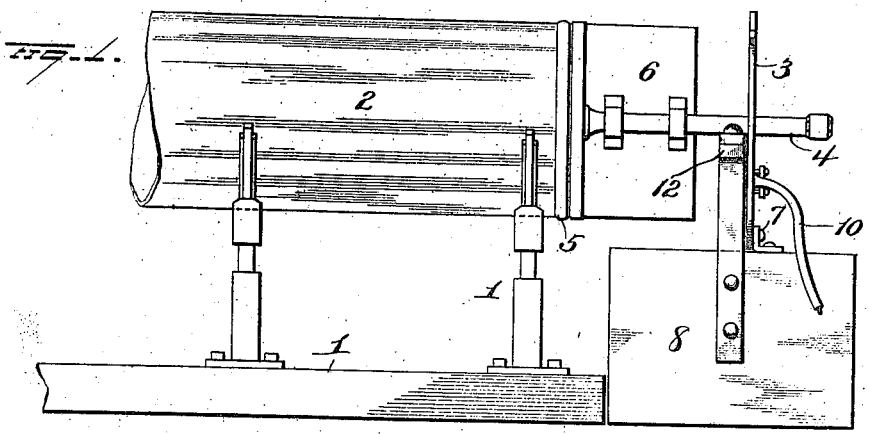
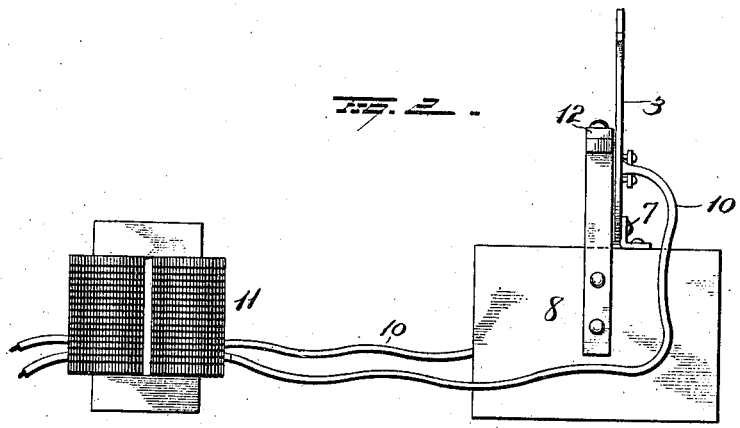
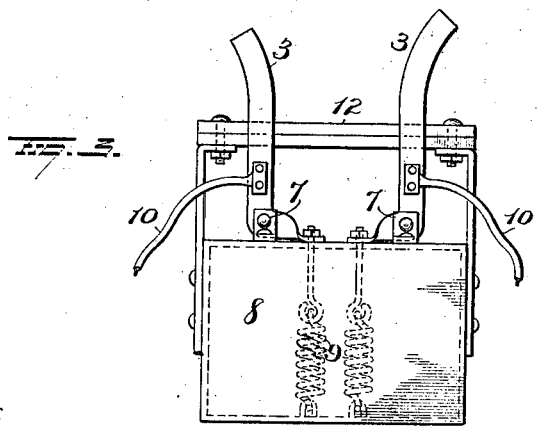
WITNESSES
INVENTOR
W. R. Campbell
By H. A. Seymour
Attorney

UNITED STATES PATENT OFFICE.

WILLIAM R. CAMPBELL, OF LANCASTER, OHIO.

APPARATUS FOR DRAWING GLASS.

1,143,104.  Specification of Letters Patent.  Patented June 15, 1915.

Application filed June 18, 1914. Serial No. 845,904.

*To all whom it may concern:*

Be it known that I, WILLIAM R. CAMPBELL, of Lancaster, in the county of Fairfield and State of Ohio, have invented certain new and useful Improvements in Apparatus for Drawing Glass; and I do hereby declare the following to be a full, clear, and exact description of the invention, such as will enable others skilled in the art to which it appertains to make and use the same.

My invention relates to an improvement in apparatus for electrically reheating a glass drawing bait.

In the manufacture of glass cylinders or rollers, after the cylinder has been drawn, the bait carrying the cylinder is disconnected from the drawing apparatus, and the cylinder with the bait attached, is turned to a horizontal position and deposited on a horse which supports it while being cut up into section. It is customary to first disconnect the bait from the cylinder, by severing the cylinder close up to the bait, but frequently, before this can be done, the unequal cooling and consequent contraction of the glass cylinder and metal bait, causes the glass to fracture, which results at times, in the loss of the whole cylinder.

The object of this invention is to provide means for heating or maintaining the contacting parts of the bait and cylinder in a heated condition after the bait has been removed from the drawing apparatus, and up to the time it is severed from the cylinder, and it consists in the parts and combination of parts as will be more fully explained and pointed out in the claims.

In the accompanying drawings, Figure 1 is a view in side elevation of one form of apparatus for carrying out my invention; Fig. 2 is a view in side elevation of same and Fig. 3 is a view in end elevation.

This improvement is particularly applicable to the system of drawing glass, wherein the portion of the bait which is engaged by the glass is of high resistance material, or otherwise constructed to be heated by an electric current, for maintaining the proper temperature of the bait and also the glass in contact with the bait, during the entire drawing operation, but it may be employed in connection with systems wherein the bait is maintained in a heated condition by means other than an electric current, during the drawing operation, and up to the time the bait with the cylinder attached is disconnected and removed from the drawing apparatus.

The apparatus claimed, comprises a horse 1 of ordinary construction, on which the glass cylinder 2 is deposited in a horizontal position after it has been disconnected and removed from the drawing apparatus, and a pair of yielding contacts 3 located in a position to engage the bait or conductor leads 4 which have electrical connection with the metal ribbon bait 5, secured to and carried by the hood 6 of the bait. The ribbon bait 5 is the part to which the glass adheres during the drawing operation, and is the part which is maintained in a heated condition by a current of electricity passed through the leads 4 during the drawing operation. The contacts 3 are bell crank in shape and are pivoted at 7 to the frame 8 located adjacent one end of the horse 1. The longer upright arms of the contacts 3 are curved at their upper ends as shown in Fig. 3, so as to permit of the ready and easy entrance of the leads 4 between them, and they are connected at the free ends of their shorter horizontal arms to springs 9 which yieldingly hold the contacts in a position to be engaged by the leads 4, and which are free to give or separate under the weight of the leads. Each contact 3 is connected with a conductor 10 both of which are connected with a current transformer or other source of supply. The frame 8 is also provided with the saddle 12 located in a position to receive and support the weight of the leads 4 and part of the weight of the bait 5—6 when the cylinder is resting on the horse 1. As soon as the leads 4 engage the contacts 3, the circuit through the ribbon 5 will be closed thus heating the same and maintaining it in a heated condition so long as the leads remain in contact with the contacts 3. By maintaining the bait and the glass adhering thereto, at approximately the same temperature, any undue contraction of either part is prevented and great saving is effected by avoiding breakage.

Having fully described my invention what I claim as new and desire to secure by Letters-Patent, is:—

1. The herein described apparatus for electrically reheating a glass drawing bait after the latter and an attached glass cylinder have been removed from a glass drawing apparatus consisting of a bait adapted to be heated electrically, conductor leads in communication with said bait, a horse for the glass cylinder, and two separated contacts located adjacent one end of the horse and each connected with conductor, the said contacts adapted to make connection with the conductor leads on the bait as the cylinder is deposited on the horse, whereby the circuit will be automatically closed and the bait and the attached end of the glass cylinder heated.

2. The combination of a horse, two yielding contacts, at the front end of the latter, an electric conductor for each contact, and a glass drawing bait having conductor leads adapted to automatically contact with the yielding contacts as the glass cylinder and its attached bait are deposited on the horse.

3. The combination with means for supporting a glass cylinder in a horizontal position, two contacts adjacent one end of said supporting means, means also adjacent said end of the cylinder supporting means for supporting the bait, an electric conductor for each contact and a glass drawing bait having conductor leads adapted to make contact with said contacts as the glass cylinder and its attached bait are deposited on the cylinder and bait supporting means.

4. The combination of a horse, bait supporting means at one end of the latter, contacts also located adjacent said end of the horse and a bait having a part to rest on said bait supporting means and two leads which engage the contacts when the bait is deposited on its support.

In testimony whereof, I have signed this specification in the presence of two subscribing witnesses.

WILLIAM R. CAMPBELL.

Witnesses:
 RALPH H. WOLFE,
 T. T. COURTRIGHT.